Dec. 9, 1969  B. H. PINCKAERS  3,482,776
TEMPERATURE CONTROL SYSTEM
Filed Jan. 26, 1968
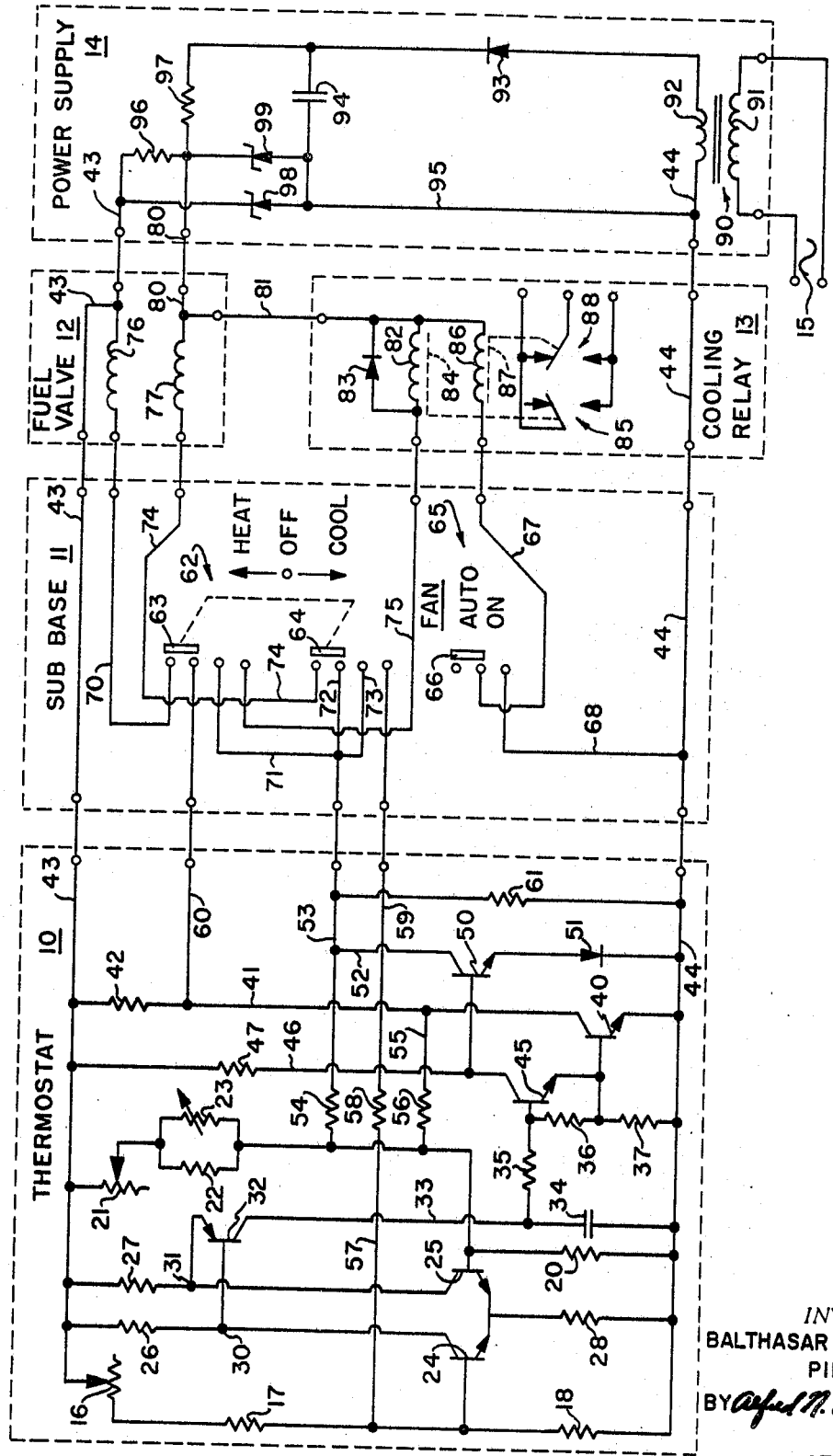
INVENTOR.
BALTHASAR H. PINCKAERS
BY *Alfred N. Feldman*
ATTORNEY.

United States Patent Office 3,482,776
Patented Dec. 9, 1969

3,482,776
TEMPERATURE CONTROL SYSTEM
Balthasar H. Pinckaers, Edina, Minn., assignor to Honeywell Inc., Minneapolis, Minn., a corporation of Delaware
Filed Jan. 26, 1968, Ser. No. 700,770
Int. Cl. G05d 15/01
U.S. Cl. 236—78                                                     4 Claims

ABSTRACT OF THE DISCLOSURE

A solid state temperature control system that uses a bridge network to control transistor circuits that operate a heating fuel valve or a cooling relay. The selection of a heating or cooling mode of operation is made by a manual switch on a subbase at the thermostat. The operation is in turn controlled by the use of feedback circuits between the transistor circuits and the bridge.

BACKGROUND OF THE INVENTION

The present invention finds particular utility in the field of temperature control for buildings. Most temperature control systems utilize thermostats having contacts that open and close thereby creating contact wear problems. In some temperature control systems temperature sensitive elements vary the condition of balance of a bridge network, but these systems usually do not have the ability to respond to both heating and cooling type demands without requiring expensive changeover arrangements. The present invention eliminates most of these problems.

SUMMARY OF THE INVENTION

The present invention is directed to a transistorized temperature control system that utiles a thermostat having no switching contacts and one which has a temperature responsive circuit that can be used for both heating and cooling.

Basically the present invention utilizes temperature responsive circuit means in the form of a bridge circuit including a thermistor that controls a transistor amplifier arrangement to in turn operate a fuel valve or a cooling relay. A feedback circuit means is utilized so that the bridge and thermistor are capable of providing both an "off-on" and modulating control of the fuel valve for continuous variations of the heat supplied to a space being controlled.

A changeover switch is provided in a subbase for the thermostat which allows switching the thermostat from a heating to a cooling control mode by merely changing the feedback circuits which interconnect the transistor amplifier and bridge. This change also provides the necessary change in mode of operation of the transistor amplifier so that it switches the cooling relay associated with the cooling equipment.

BRIEF DESCRIPTION OF THE DRAWING

The single figure discloses a circuit diagram of a complete temperature control system for a controlled space wherein a thermostat, subbase, fuel valve, cooling relay and power supply make up the entire system.

DESCRIPTION OF THE PREFERRED EMBODIMENT

The temperature control system is made up of a number of individual units that are mounted at convenient locations in a conventional manner. The system includes a thermostat means 10 and a subbase 11, upon which the thermostat is mounted when the system is used for both heating and cooling. A fuel valve means 12 controls the flow of fuel to a furnace, not shown. A cooling relay means 13 contains the control elements for operating a refrigeration compressor, not shown, for cooling. The final element making up the overall system is a power supply means 14 which is connected to a conventional source of power 15 for supplying the necessary voltages for operating the temperature control system. The thermostat means 10, subbase 11, fuel valve means 12, cooling relay means 13, and power supply means 14 will each individually be described as to their makeup before the overall operation of the system is described.

Thermostat means 10 includes a temperature responsive circuit means in the form of a bridge network including calibrating potentiometer 16, resistor 17, resistor 18, resistor 20, a set point potentiometer 21, and a pair of parallel resistors 22 and 23. Resistor 23 is a temperature responsive element or negative temperature coefficient thermistor which actually does the sensing of temperature of the controlled space to change the bridge network output as a function of the temperature. Further included in the bridge are a pair of transistors 24 and 25 that are connected through resistors 26 and 27 to form along with resistor 28 an amplified output for the bridge at terminals 30, 31. The state of balance of the bridge changes the conduction of transistors 24 and 25 thereby changing the voltages appearing at points 30 and 31 to in turn change a bias to a third transistor 32 that forms a controlled output from the bridge depending on the value of thermistor 23. Transistor 32 in turn is connected by conductor 33 to a capacitor 34 and a voltage divider network made up of resistors 35, 36 and 37. As the conduction of transistor 32 changes due to a difference in potential across points 30 and 31, a varying voltage appears across the voltage divider made up of the resistors 35, 36 and 37. The last named resistors make up a voltage divider output means for the bridge or temperature responsive circuit means. This output is amplified by additional transistors.

A transistor 40 has its base-emitter circuit connected across resistor 37 and has its collector connected by conductor 41 to heat anticipator resistor 42 to a conductor 43 that supplies power to the thermostat means 10 from the power supply means 14. The power supply means 14 also supplies power on conductor 44. A transistor 45 has its base-emitter circuit connected across resistor 36 and has its collector connected by conductor 46 and resistor 47 to conductor 43 to obtain power for its operation.

A third transistor 50 has its base-emitter circuit connected across the transistors 40 and 45 through a diode 51 and in turn has its collector connected by conductor 52 to a conductor 53 that provides a conduction path from the power supply means 14 through other components as will be described, and provides a path through resistor 54 that forms a negative feedback path to the base of transistor 25. A positive feedback path is provided within the thermostat means 10 by conductor 55 and resistor 56 that connect the collector of transistor 40 to the base of transistor 25. A third feedback circuit is provided within the thermostat means 10 by conductor 57 and resistor 58 through the associated subbase means 11 on conductor 59. This feedback circuit provides a positive feedback from the collector of transistor 50 via the subbase 11 (during one phase of operation) through the resistance 58 and conductor 57 to the base of transistor 24 for a function that will be brought out during a discussion of the operation of the system.

The collector of transistor 40, in addition to being connected to conductor 41, is also connected to conductor 60 to provide an output circuit for the transistor 40 through subbase means 11. A resistor 61 forms the last component in thethermostat means 10 and is connected between the conductors 53 and 44 to "shape" or balance the internal dissipation of transistor 50.

The subbase means 11 is a mounting means for thermostat means 10 when both heating and cooling modes are used. In order to obtain the heating or cooling function a manual switching means 62 is provided. In the position shown in the drawings, the manual switching means 62 is in the "heat" position. The switching function is accomplished by a pair of shorting bars 63 and 64 which slide across a group of terminals shorting them in sequence. In the position shown, the upper terminals are shorted by the bars 63 and 64. As the manual switching means 62 is moved to the "off" or center position, the center pair of terminals are shorted by the bars 63 and 64. In the "cool" position, the bars 63 and 64 short the lower two terminals of each of the groups of four shown. This type of switching is conventional and it is only necessary to understand that shorting bars 63 and 64 change a function upon a manual change of their position. A second manual switching means 65 has been disclosed with a shorting bar 66 to provide an "automatic" and "on" control of a fan, not shown, in the cooling equipment. Switch 65 in the "Auto" position shown provides an open circuit to a conductor 67 from the conductor 68 and removes the fan relay 86 from operation. When the bar 66 is moved to its "on" or lower position, the conductors 67 and 68 are connected so that relay 86 in the cooling relay means 13 energizes a fan continuously. This function is conventional and does not form a part of the present invention but has merely been shown to complete a disclosure of a temperature control system.

The manual switching means 62, in the position shown, provides a continuous conduction path from the conductor 60 through bar 63 to a conductor 70. Also provided is a continuous conduction path between the conductor 53 and a group of conductors 71, 72 and 73. The conductor 72 connects through the bar 64 to a conductor 74 in the position shown to provide one circuit configuration in the heating mode of operation.

In the cooling mode of operation bar 63 connects conductor 71 to conductor 75 which in turn connects to the cooling relay means 13. At the same time bar 64 connects the conductor 59 to conductor 73 for a feedback function that will be described in connection with the operation of the system.

A fuel valve means 12 which controls the flow of fuel to a burner, not shown, provides the necessary heat during the heating mode of operation. The fuel valve means 12 contains two electrically controllable operating means or solenoids 76 and 77. The solenoid 76 causes the valve to open from a full "off" position to a minimum flow position upon energization of the solenoid. The solenoid 77 controls the flow of fuel through valve means 12 in a modulating fashion after the solenoid 76 is energized. Solenoid 77 operates in a fashion reverse to that of a normal valve in that the solenoid 77 when fully energized allows a minimum flow. The flow through valve means 12 increases to a maximum as the current through solenoid 77 is decreased. The solenoid 76 is connected between the conductor 70 and the conductor 43 while the solenoid 77 is connected between the conductor 74 and a pair of conductors 80 and 81. Conductor 80 connects to the power supply means 14 while conductor 81 in turn supplies power to the cooling relay means 13.

The cooling relay means 13 includes two relays. The first relay 82 has a free-wheeling diode 83 connected across it to protect the transistor circuitry that energizes the relay 82. Relay 82 is connected mechanically at 84 to a switch means 85 to in turn control equipment such as a compressor in an "off-on" fashion as is conventional in cooling equipmnet. The second relay 86 is connected between the conductor 81 and the conductor 67 in the subbase means 11 for control of a fan in the cooling equipment. The relay 86 is connected mechanically at 87 to a switch means 88 for operation of the fan either automatically along with the relay 82 or manually, in response to the positioning of the switch means 65.

The last basic element making up the temperature control system is the power supply means 14. The power supply means 14 obtains power from source 15 through a step-down transformer 90 that has a primary winding 91 and a secondary winding 92. The secondary winding 92 is connected through a diode 93 to a filter capacitor 94 by conductor 95. This provides a filtered direct current power source. In order to complete the filtering a pair of resistors 96 and 97 are provided. To stabilize the voltages obtained from the power source, a pair of Zener diodes 98 and 99 are provided. The Zener diode 98 connects to conductor 43 while the Zener diode 99 connects to conductor 80 to provide the output voltages for the operation of the system. The stabilized voltage across Zener diode 99 is greater than that across Zener diode 98.

OPERATION-HEATING MODE

If the temperature control system is assumed to be in the heating mode of operation with the thermostat satisfied, there is insufficient output to transistor 32 between the junctions 30 and 31 and transistor 32 is nonconductive. Upon a temperature drop, the thermostat means 10 senses this change by the thermistor 23 increasing in resistance. A sufficient voltage difference appears between points 30 and 31 and the transistor 32 begins to conduct. The conduction is from the supply line 43 through resistor 27 and the emitter-collector portion of the transistor 32 with the current flowing in conductor 33 and through the voltage divider output means made up of the resistors 35, 36 and 37. The current flow causes a voltage increase across resistors 37 and 36. The voltage appearing across resistor 37 progressively turns the transistor 40 "on" and allows it to conduct from the conductor 43 to the conductor 44 through anticipator resistor 42. Also, a path can be traced from the power supply conductor 43, through solenoid 76, conductor 70, bar 63, and conductor 60 to the conductor 41. The voltage change that occurs across resistor 42 causes a positive feedback to be fed on conductor 55, and resistor 56 to the base of transistor 25. The positive feedback voltage causes the transistor 40 to conduct even more, and is purposely made regenerative so as to cause a switching action to occur to pull in or energize the solenoid 76 without any form of modulating action. This current flow through the solenoid 76 causes the solenoid to open the fuel valve means 12 to a minimum flow position allowing fuel to flow to a burner where it is ignited and used to generate heat.

If the temperature in the controlled space further decreases, which means more heat is needed, the bridge is further changed by the change in the value of the thermistor 23 to further increase the conduction of transistor 32 and thus to increase the voltage drop across the resistor 36. The increased drop in voltage across resistor 36 causes the transistor 45 to begin conduction. This increase in conduction causes an increased voltage drop to occur across the resistor 47 and the change in voltage thus caused is transmitted to the base of transistor 50 causing it to lessen its conduction. The conduction of current through transistor 50 is from conductor 80 through solenoid 77, conductor 74, switch bar 64 and conductor 53. Solenoid 77 causes the fuel valve means 12 to open to a greater degree as the current drawn through it decreases. It is thus apparent that as the sensor temperature decreases calling for more heat, transistor 32 increases conduction which in turn causes a greater voltage drop across resistor 36. This increases conduction in transistor 45 which in turn decreases conduction in transistor 50. In order to establish a stable and reproducible modulating range for transistor 50, a negative feedback circuit is established from conductor 53 through resistor 54 to the base of transistor 25. This negative feedback "linearizes" the modulating action which controls the position of the solenoid 77 and also is the principal factor which determines the throttling range or proportional band in which the current in solenoid 77 is proportional to the resistance or temperature of thermistor 23.

It is obvious that as the temperature rises at the thermostat means 10 and as the thermistor 23 forces the bridge back towards a balanced state, that the modulating transistor circuit means made up of transistors 45 and 50 causes the modulation to cease. Further temperature rise will suddenly and regeneratively render transistor 40 nonconductive so that then fuel valve means 12 closes completely.

It will be noted at this point that the cooling relay means 13 provided no function and that the subbase means 11 provided only a connection between the thermostat means 10, the fuel valve means 12, and power supply means 14. It is obvious that the subbase means 11 and the cooling relay means 13 could be omitted if only a heating installation were required. The functions of these parts could be replaced by direct connections.

OPERATION-COOLING MODE

If it is desired to operate cooling equipment with the control system, it is necessary to move the manual switching means contained in the subbase means 11. This involves moving switch means 62 from the "heat" position to the "cool" position. In so doing, the bars 63 and 64 move from the position shown to complete contact between the two lower terminals associated with each of the sliding bars. The fan relay 86 at this time has the abiliity to be operated either manually or automatically depending on the position of switch means 65, and again it is pointed out that this is not material to the present invention. This merely completes the overall system.

In the cooling mode with a space temperature above the control point of the thermostat means 10, the transistors 32, 40 and 45 are in a nonconductive state. With transistors 40 and 45 nonconductive, the transistor 50 is conducting fully. Its current conduction path is through conductor 81, relay 82, conductor 75, bar 63, conductor 71, conductor 53, and conductor 52. The conduction through relay 82 energizes the relay and operates switch means 85 to operate the cooling equipment to lower the temperature in the controlled space.

At this same time, a positive feedback path is provided for transistor 50 to make the transistor 50 switch rather than modulate with changes in temperature. The feedback path is through conductor 52, conductor 53, conductor 73, bar 64, conductor 59, resistor 58, conductor 57 to the base of transistor 24. It is noted that with switch 62 in the "cool" position an additional feedback path, yielding positive feedback, is added from the collector of transistor 50 to the base of transistor 24. The already existing feedback path, from the collector of transistor 50 to the base of transistor 25 through resistor 54, yielded negative feedback as described before. The additional feedback path through resistor 58 is so proportioned that the overall net feedback is changed from negative to positive feedback for the transistor 50. Changing the feedback from a negative feedback (usable for modulation) to a positive feedback (usable for a switching action) is necessary due to the change in the kind of load being controlled. This switching action cleanly operates relay 82 to turn "on" the cooling equipment.

As the cooling equipment controlled by relay 82 is operated, the temperature at the thermostat means 10 is reduced until the voltage between points 30 and 31 causes transistor 32 to conduct. The conduction of transistor 32 in turn causes transistors 40 and 45 to conduct. This causes the removal of transistor 50 from conduction and removes the path for energization of relay 82 which drops out thereby disconnecting or turning "off" the cooling equipment.

In the present temperature control system for maintaining a proper temperature in a controlled space, it has been possible to eliminate the normally moving parts contained in a thermostat by the use of a thermistor. By merely changing the net feedback from negative to positive, a function can be obtained that allows the same transistor amplifier means to be used as a modulating system or as a switching system to accomplish the necessary modulation of the fuel valve means 12 and the "off-on" switching of the cooling relay means 13. The use of a feedback circuit also allows for the necessary initial switching action of transistor 40 to pull in solenoid 76 in an "off-on" or snap acting fashion to open the fuel valve means 12 to a minimum flow position as is normally required to cause a burner to operate safely. By the very simple expedient of a switching means and feedback circuits, it is possible to obtain both a heating and cooling function without other auxiliary equipment or moving parts. The present system is exceedingly simple and compact.

While the feedback circuits in the present device have been shown as a means of obtaining the modulating and switching action of the transistors 40, 45 and 50, it would be possible to obtain the necessary modulating and switching actions by other forms of feedback systems such as closed loops within the transistor circuitry other than through the means of the bridge itself. Since this is the case, the applicant does not wish to be limited solely to the types of feedback circuits shown and specifically described in the preferred embodiment.

The embodiments of the invention in which an exclusive property or right is claimed are defined as follows:

1. A temperature control system for a controlled space, including: means constructed and arranged to sense a temperature to be controlled and having an output voltage which changes with changes in temperature; fuel valve means having a first and a second electrically controllable operating means capable of opening said fuel valve means to a minimum flow position and then modulating to a full flow position; first transistor circuit means having an input connected to said output voltage and an output connected through said first controllable operating means; said first transistor circuit means further having positive feedback circuit means to cause said first transistor circuit means to switch and operatively energize said valve means to its minimum flow position; second transistor circuit means having an input connected to said output voltage and an output connected through said second controllable operating means; and said second transistor circuit means further having a negative feedback circuit means to cause said second transistor circuit means to operatively energize said valve means in a modulating manner between said minimum flow position and said full flow position.

2. A temperature control system for a controlled space as described in claim 1 wherein said means constructed and arranged to sense a temperature includes power supply means and thermostat means having temperature responsive circuit means connected to said power supply means; said temperature responsive circuit means having voltage divider output means across which said output voltage exists.

3. A temperature control system for a controlled space as described in claim 2 wherein said temperature responsive circuit means is bridge circuit means.

4. A temperature control system for a controlled space as described in claim 3 wherein said feedback circuit means are circuits from the output means of each of said transistor circuit means to said bridge circuit means.

References Cited

UNITED STATES PATENTS 2,245,773   6/1947   Grant _____ 236—10

ROBERT A. O'LEARY, Primary Examiner

C. SUKALO, Assistant Examiner

U.S. Cl. X.R.

165—39